United States Patent
Peffers et al.

(10) Patent No.: US 10,462,110 B2
(45) Date of Patent: Oct. 29, 2019

(54) SYSTEM, APPARATUS AND METHOD FOR PROVIDING A UNIQUE IDENTIFIER IN A FUSELESS SEMICONDUCTOR DEVICE

(71) Applicant: Intel Corporation, Santa Clara, CA (US)

(72) Inventors: Simon N. Peffers, Acton, MA (US); Sean M. Gulley, Boston, MA (US); Vinodh Gopal, Westborough, MA (US); Sanu K. Mathew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 284 days.

(21) Appl. No.: 15/434,194

(22) Filed: Feb. 16, 2017

(65) Prior Publication Data
US 2018/0234258 A1    Aug. 16, 2018

(51) Int. Cl.
| H04L 29/06 | (2006.01) |
| G06F 1/04 | (2006.01) |
| G09C 1/00 | (2006.01) |
| H04L 9/08 | (2006.01) |
| G06F 16/00 | (2019.01) |
| H04L 9/32 | (2006.01) |

(52) U.S. Cl.
CPC ............ *H04L 63/0428* (2013.01); *G06F 1/04* (2013.01); *G06F 16/00* (2019.01); *G09C 1/00* (2013.01); *H04L 9/0866* (2013.01); *H04L 9/3278* (2013.01); *H04L 63/0876* (2013.01)

(58) Field of Classification Search
None
See application file for complete search history.

(56) References Cited

U.S. PATENT DOCUMENTS

| 9,811,689 B1* | 11/2017 | Tseng | G06F 21/73 |
| 2008/0279373 A1* | 11/2008 | Erhart | H04L 9/302 380/46 |
| 2013/0083586 A1* | 4/2013 | Petitprez | H01L 23/544 365/102 |
| 2014/0201851 A1* | 7/2014 | Guo | H04L 9/0866 726/34 |

(Continued)

OTHER PUBLICATIONS

U.S. Appl. No. 15/379,283, filed Dec. 14, 2016, entitled "Systems and Methods for Guardband Recovery Using in Situ Characterization," by Simon N. Peffers, et al.

(Continued)

*Primary Examiner* — Amir Mehrmanesh
(74) *Attorney, Agent, or Firm* — Trop, Pruner & Hu, P.C.

(57) ABSTRACT

In one embodiment, an apparatus includes: a device having a physically unclonable function (PUF) circuit including a plurality of PUF cells to generate a PUF sample responsive to at least one control signal; a controller coupled to the device, the controller to send the at least one control signal to the PUF circuit and to receive a plurality of PUF samples from the PUF circuit; a buffer having a plurality of entries each to store at least one of the plurality of PUF samples; and a filter to filter the plurality of PUF samples to output a filtered value, wherein the controller is to generate a unique identifier for the device based at least in part on the filtered value. Other embodiments are described and claimed.

18 Claims, 13 Drawing Sheets

(56) References Cited

U.S. PATENT DOCUMENTS

2015/0200020 A1* 7/2015 Jothikumar ............ G11C 17/18
                                                        365/96
2016/0285639 A1   9/2016 Mathew et al.
2017/0134175 A1*  5/2017 Skudlarek ................ H04L 9/10
2017/0164191 A1*  6/2017 Orcutt ................... H04W 12/06
2017/0344760 A1* 11/2017 Jennings ............... G06F 21/554

OTHER PUBLICATIONS

NXP Semiconductors N.V., "NXP secure microcontroller SmartMX2 P60-Step-Up!," 2016, 2 pages.

* cited by examiner

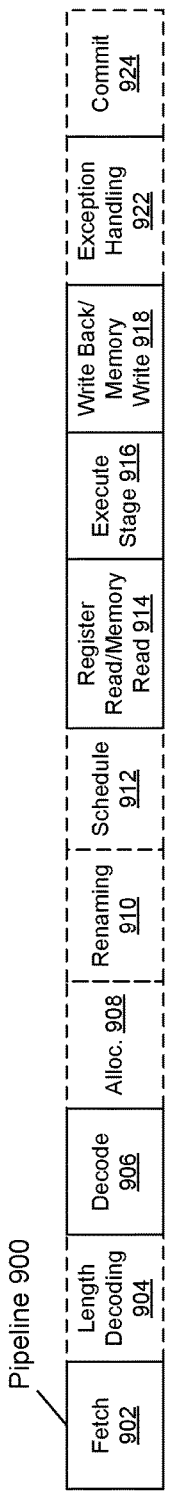
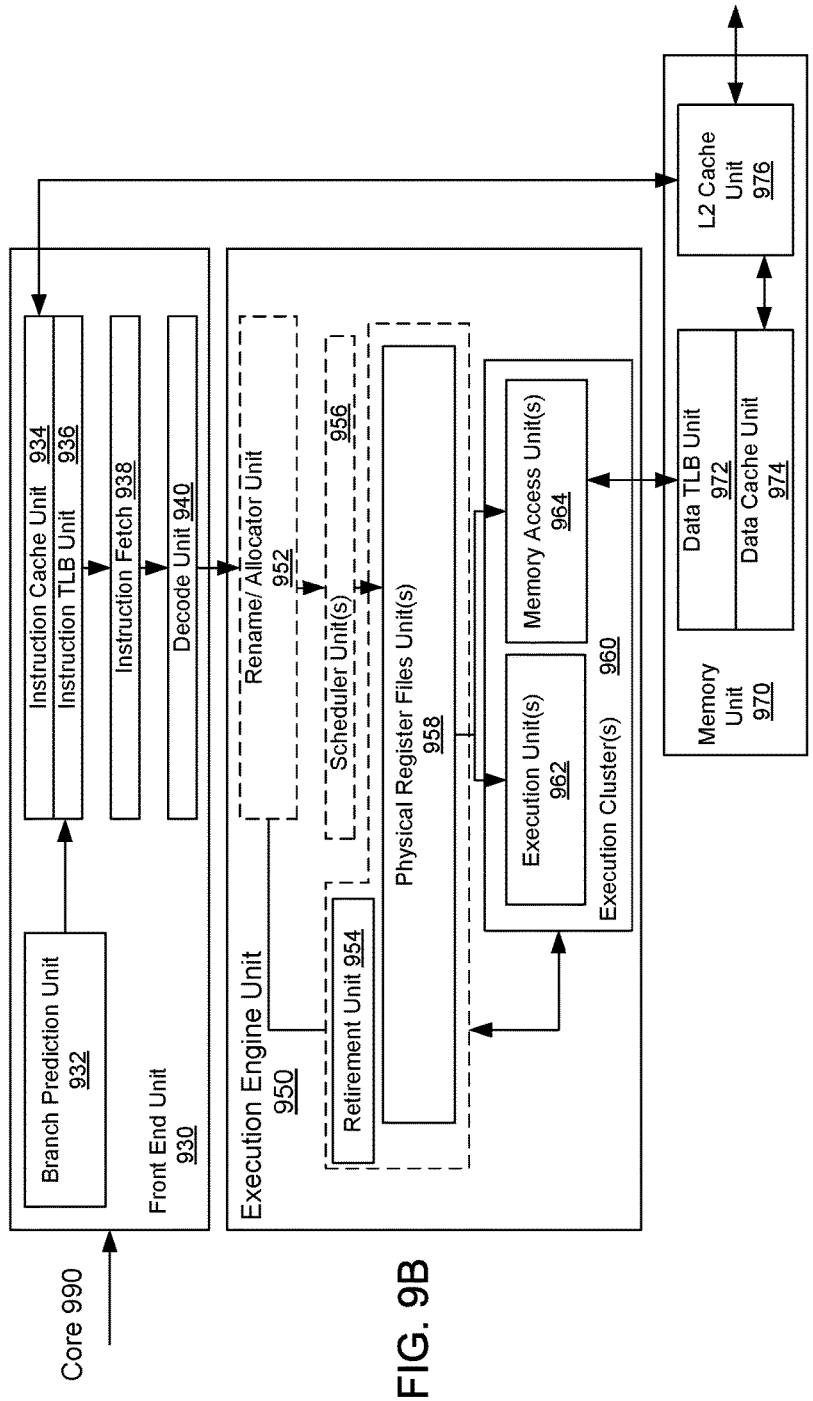
FIG. 9A
FIG. 9B

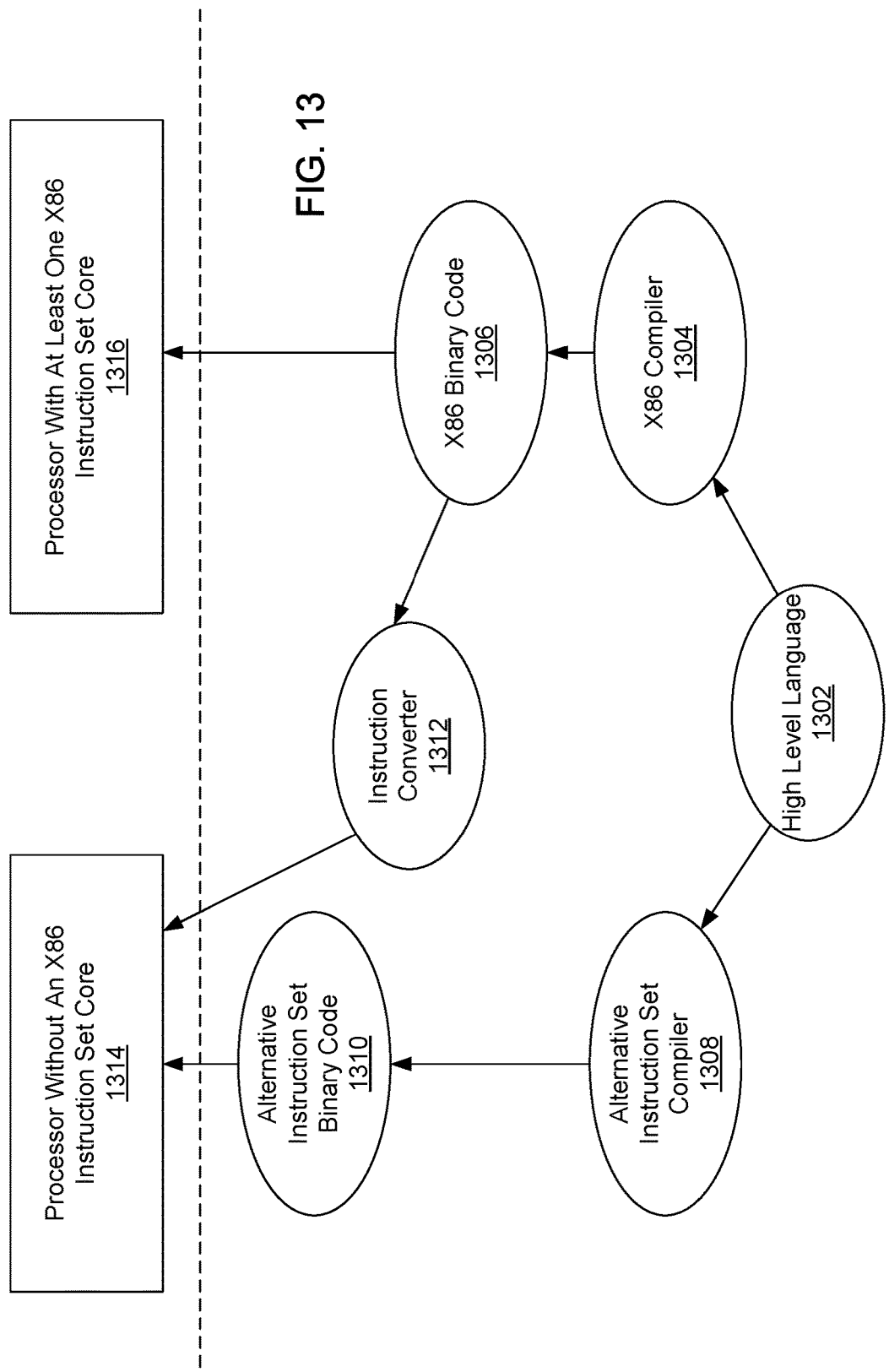

SYSTEM, APPARATUS AND METHOD FOR PROVIDING A UNIQUE IDENTIFIER IN A FUSELESS SEMICONDUCTOR DEVICE

TECHNICAL FIELD

Embodiments relate to integrated circuits and more particularly to providing an identifier for such devices.

BACKGROUND

Security is a real and growing concern in technology today. Devices ranging from computers to cars, drones, watches, thermostats among others, are becoming connected and rely increasingly on encryption to ensure that data is not compromised. Typically, providing encryption capabilities for a device increases device size, complexity and cost. However, certain classes of silicon devices such as low cost integrated circuits are designed with efforts to emphasize simplicity. Design simplification is likely to increase as function-specific accelerators become more common and low cost Internet of Things (IoT) edge devices (such as sensors) proliferate. Removing unessential circuitry from a given integrated circuit saves on design complexity, and can lead to faster time to market and lower cost. However, certain functionality such as cryptographic capabilities can be impaired when a device lacks certain circuitry.

BRIEF DESCRIPTION OF THE DRAWINGS

FIG. 9A is a block diagram of an exemplary in-order pipeline and an exemplary register renaming, out-of-order issue/execution pipeline to be included in a processor according to embodiments of the invention.

FIG. 9B is a block diagram illustrating both an exemplary embodiment of an in-order architecture core and an exemplary register renaming, out-of-order issue/execution architecture core to be included in a processor according to embodiments of the invention.

FIG. 13 illustrates a block diagram contrasting the use of a software instruction converter to convert binary instructions in a source instruction set to binary instructions in a target instruction set according to embodiments of the invention.

DETAILED DESCRIPTION

Figure 1:
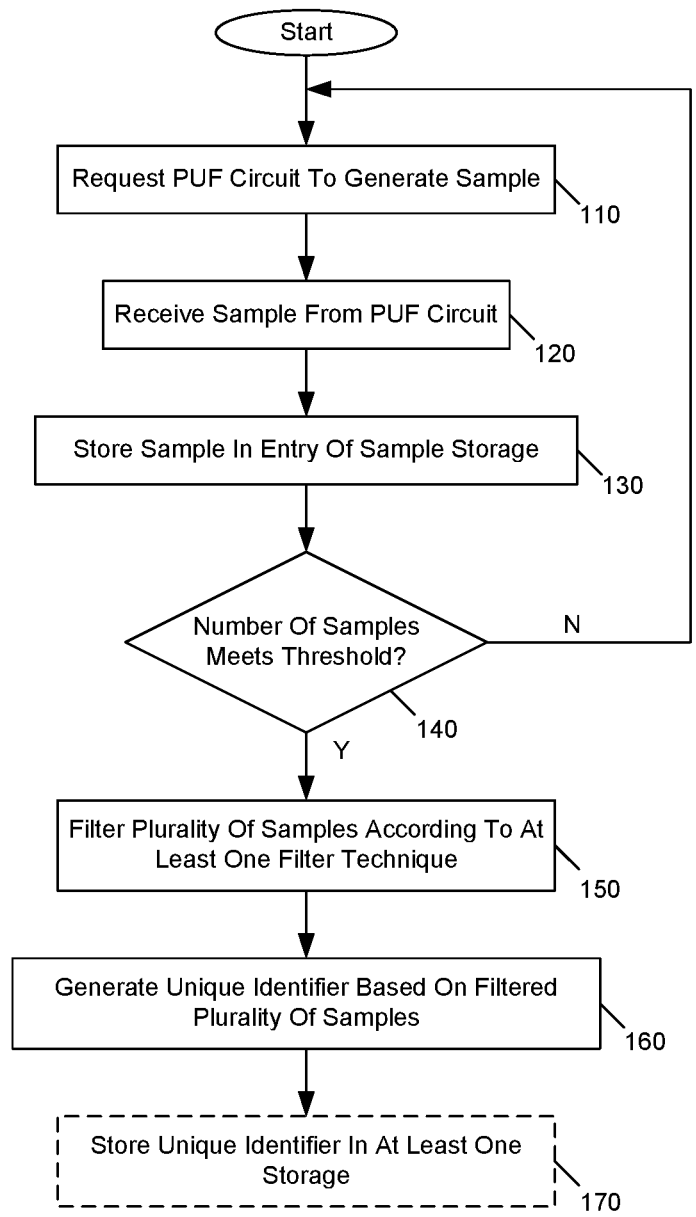
FIG. 1 is a flow diagram of a method in accordance with an embodiment of the present invention.

In various embodiments, a hardware/software based system is provided to extract entropy from manufacturing variability within a silicon device such as an integrated circuit. Thereafter filtering techniques may be applied to the extracted entropic information to obtain a stable, repeatable random number based at least in part on this variability. In the context of an integrated circuit, this capability places minimal demand on circuits and can avoid inclusion of non-volatile storage such as fuses for storing a device-specific identifier, error correction or other information. In this way, chip design may be simplified, and additional flexibility is realized to make changes and enhancements over time.

As will be described herein, embodiments may leverage device-inherent variability to dynamically generate (and re-generate) a random number, also referred to herein as a "unique identifier (ID)." In practice this number may be used as a device-specific identifier or a private key. In different embodiments combinations of hardware and software may be used to collect samples from a source of manufacturing variability and use statistical filtering to derive a repeatable unique ID in a fuseless manner. Understand that depending on implementation and context, the number of samples to be collected may vary based on a variety of factors such as noisiness of the underlying function, degree of repeatability indicated for the final value, and properties of the source of manufacturing variability.

More specifically, embodiments provide Physically Unclonable Function (PUF) circuitry within an integrated circuit to provide a source of entropy based on manufacturing variability. While many different types of PUF circuits can be used, in an embodiment a PUF circuit may be formed of a plurality of PUF cells each including a cross-coupled inverter circuit. Of course, other sources of variability may be used. Depending on desired implementation, a PUF circuit can include a selected number of PUF cells (e.g., between 32 bits and 128 bits, in some embodiments), each to provide a bit of entropy. In some cases, the output of the PUF circuit may be noisy, with some bits of the output changing each time they are read. Some bits may be essentially random, while other bits will tend to initialize to a logic zero or logic one value with some regularity. Various methods are used to filter the output to reduce noise and produce a more stable output. Embodiments combine hardware and software techniques to produce a stable unique ID or key, without reliance on hardware or non-volatile storage to reduce noise from unstable bits and produce a stable output value.

In an embodiment, filtering techniques to at least reduce and possibly remove noise may include: temporal majority voting and dark bit masking. For temporal majority voting, each bit may be sampled multiple times and the number of logic ones is summed. If the probability of reading a logic one value is greater than 50%, then the bit is determined to be a logic one in the final output. In dark bit masking, bits that are highly unstable are identified and masked from further use.

After collection of a desired number of samples output from the PUF circuit (in some cases between 1000 and 10000 samples), statistical algorithms may be executed to filter out noise. In a particular embodiment multiple techniques may be used. In one specific embodiment these filtering techniques include dark bit masking, in which bits that have a probability of between approximately 20% and 80% of being logic one (or equally logic zero) are masked from use, to remove the most unstable bits from consideration. Understand of course that the exact percentages may vary based on a given application. Thereafter a temporal majority voting technique is performed in which the remaining bits are summed over time. Bits that sum to more than 50% (e.g.) of the sample size are considered to be a logic one value (and otherwise are considered to be a logic zero value).

By performing these filtering techniques in software, the ability to work with large sample sizes is realized. For example, 1000 samples of the PUF circuit output can be used. It is trivial to increase the sample size, provided runtime does not become a constraint. By performing this filtering in software, more complex functions can be applied. In addition, filtering techniques can be modified or upgraded over time, for example, as the device ages or as better filter functions are developed. As an example, as a device ages, different filter parameters can be used to maintain stable results. For example, it may be possible that individual PUF levels become less evenly distributed between logic one and logic zero values as the device ages, such as logic zero becoming more common as measured by a large set of devices. Still further, embodiments can use software to adapt to use of other sources of manufacturing variability to produce a unique ID. By performing software-based filtering as described herein, post-silicon adaptability over time and to the unique nature of each stepping/lot/wafer is realized. Filter parameters may also be more finely tuned to each stepping/lot/wafer to provide improved results. As an example, a dynamically controllable cutoff for dark bit masking can be used (namely a cutoff range between, e.g., 20-80%, to filter out less stable bits).

Thus in different embodiments, a unique ID or private key can be generated using a hybrid hardware/software approach, allowing for a range of applications and circuit complexity. Hardware PUF circuits provide a source of entropy, with a sufficient number of bits initializing to high or low with some regularity between samples. A software process is able to request multiple samples from the circuits so that a statistical analysis can be performed.

Referring now to FIG. 1, shown is a flow diagram of a method in accordance with an embodiment of the present invention. More specifically, method 100 shown in FIG. 1 may be performed by hardware circuitry, software, firmware, and/or combinations thereof. For ease of discussion, it is assumed that control circuitry or logic that controls operation of one or more PUF circuits performs method 100. In different implementations, method 100 may be performed within an integrated circuit itself including PUF circuitry. In other cases, method 100 may be performed by circuitry of a different integrated circuit or system than one or more integrated circuits including PUF circuitry as described herein. As an example a controller may couple to one or more integrated circuits including PUF circuitry as described herein.

In any case, method 100 begins by requesting a PUF circuit to generate a sample (block 110). Understand that this request that is issued from the control logic may be to a PUF circuit itself formed of a plurality of PUF cells. In such cases, the request can be issued, e.g., by way of a clock signal sent to all of the individual PUF cells, to trigger a sample generation. Next control passes to block 120 where a sample is received from the PUF circuit. In an embodiment where the control logic is located on a different integrated circuit than an integrated circuit including the PUF circuit, this sample receipt may be via a Joint Test Action Group (JTAG) interface. Of course in other cases the sample may be received via another type of interface.

Understand that the sample may include multiple bits each corresponding to a sample output by a given PUF cell. In an example embodiment in which a PUF circuit includes 64 different PUF cells, a single sample thus may include 64 bits, corresponding to a sample bit output by each of the individual PUF cells. Control next passes to block 130 where the sample may be stored in an entry of a sample storage. This sample storage may be a temporary buffer, such as a buffer allocated within a cache memory associated with the control logic. In other cases this buffer can be located in other storages, such as a system memory.

Still with reference to FIG. 1, control next passes to diamond 140 to determine whether the number of received samples meets a threshold. That is, using filtering as described herein, a programmable number of individual samples can be generated by the PUF circuitry and later analyzed. Depending upon a given use case, the threshold number may be set at a relatively high number of samples, e.g., 500, 1000, 10000 or so forth. This is the case as without dedicated hardware storage for these samples, the dedicated circuitry required for performing method 100 may be relatively minimal, yet can benefit from a large number of sample collections.

Still with reference to FIG. 1, when it is determined that the number of samples meets the threshold, at block 150 the samples are filtered according to at least one filter technique. Although the scope of the present invention is not limited in this regard, such filter techniques may include a temporal majority voting (TMV) filtering, dark bit masking, error correction coding, combinations thereof, or so forth.

After performing the indicated filtering (which may be dynamically programmed according to a given use case), control next passes to block 160 where a unique identifier may be generated based on the filtered samples. As an example, with TMV and/or dark bit masking, a single bit associated with each valid PUF cell can be determined, with the resulting bits of the valid PUF cells thus forming a unique ID. As will be described further herein, this unique ID can be used for a wide variety of purposes, including to provide a unique identifier for an integrated circuit that is not manufactured to include such identifier (e.g., owing to the relative complexity and cost of providing fuse or other non-volatile storage for storage of such identifier). In other cases, the unique identifier may be used as a secret key such as a private key of the integrated circuit to be used for performing challenge/response authentications, securing communications by way of encryption/decryption and so forth.

Understand in other cases, as shown in the optional dashed block 170 of FIG. 1, this unique identifier can be stored in at least one storage. For example, this unique identifier can be stored in a volatile storage of the integrated circuit for use until power is removed from the integrated circuit or the value may be stored in non-volatile storage on the device. It is also possible to store this unique identifier in association with various information associated with the integrated circuit such as within a database entry. For example, a manufacturing time-generated database may store information regarding characterization information, operating parameter information or so forth of the integrated circuit in association with the unique identifier. In this arrangement, data generated during manufacturing may be provisioned to a customer by providing a database of manufacturing data to the customer for all integrated circuits purchased (e.g., for large customers). To make this data available to many smaller customers, a challenge-response protocol may be performed to prove that a given customer possesses a given integrated circuit, and once authorized the manufacturing data associated with the particular integrated circuit (e.g., stored in a cloud-based storage) can be accessed by the customer.

Figure 2:
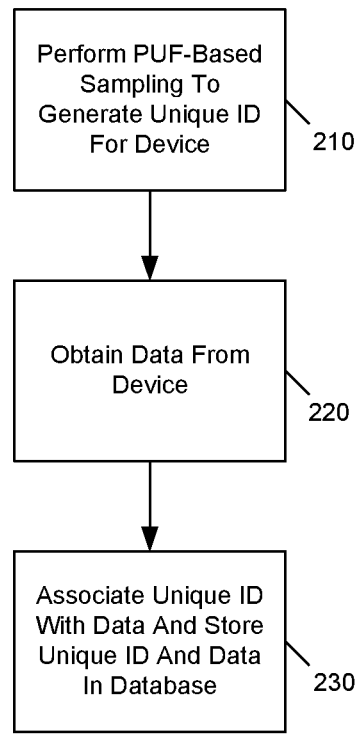
FIG. 2 is a flow diagram of a method in accordance with another embodiment of the present invention.

Referring now to FIG. 2, shown is a flow diagram of a method in accordance with another embodiment of the present invention. Method 200 shown in FIG. 2 is a method for using PUF circuitry as described herein to generate a unique identifier to be used for identifying a particular integrated circuit lacking such unique identifier and associating the identifier with device-specific information. Method 200 may be performed by hardware circuitry, software, firmware, and/or combinations thereof. More specifically as shown in FIG. 2, method 200 begins by performing PUF-based sampling to generate a unique identifier for the device (block 210). In an embodiment, operations as described above with regard to FIG. 1 may be performed to generate a unique identifier for the device.

Next at block 220 data may be obtained from the device. In a manufacturing context, the device can be characterized by running test workloads at a variety of voltage, frequency and/or temperature conditions to identify capabilities of the particular device. For example, by way of such manufacturing testing it can be determined that the device can operate at particular voltages, frequencies and/or temperatures properly, while operation at other such parameters may lead to failure, e.g., of the workload or device. Based on such testing, a set of appropriate operating parameters for the device, such as a set of voltage and frequency points for corresponding temperature levels, can be determined. Thereafter this information, which may correspond to a characterization table for the device, can be stored in a database, along with association of the unique identifier (block 230). In an embodiment, this database can be maintained in a cloud server, which sends the various parameters to a given appliance when requested. In turn, during normal operation the unique identifier of the device can be generated and used to access this database to determine operating parameters, e.g., based on a particular temperature at which the device is operating. Of course many other examples of associating data with a device (and its corresponding unique identifier are possible). For example, a location of the device can be stored (e.g., building, floor, room), making it easy to locate the device in the future. Or the owner of the device may be stored, such as in an asset tracking system. Understand while shown at this high level in the embodiment of FIG. 2, many variations and alternatives are possible.

Figure 3:
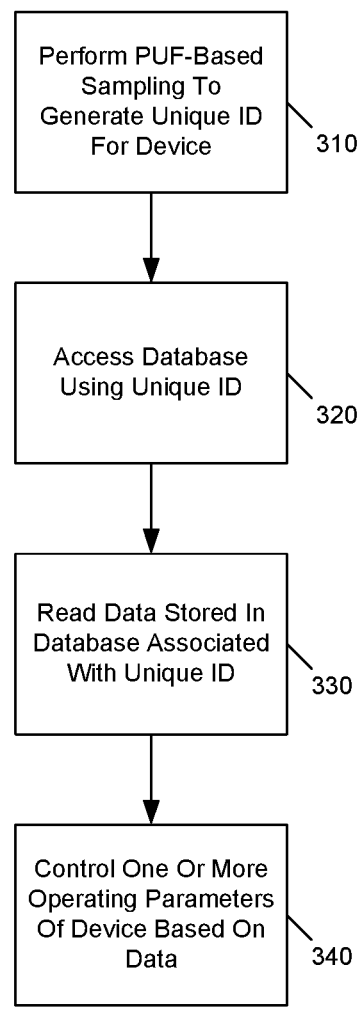
FIG. 3 is a flow diagram of a method in accordance with yet another embodiment of the present invention.

Referring now to FIG. 3, shown is a flow diagram of a method in accordance with yet another embodiment of the present invention. Method 300 shown in FIG. 3 is a method for using PUF circuitry as described herein to generate a unique identifier to be used for identifying a particular integrated circuit lacking such unique identifier and using this identifier to access and control the integrated circuit. Method 300 may be performed by hardware circuitry, software, firmware, and/or combinations thereof. More specifically as shown in FIG. 3, method 300 begins by performing PUF-based sampling to generate a unique identifier for the device (block 310). In an embodiment, operations as described above with regard to FIG. 1 may be performed to generate a unique identifier for the device.

Next at block 320 a database is accessed using this unique identifier. For example, a characterization database may be accessible by a controller by use of this unique identifier. More specifically at block 330, an entry associated with this unique identifier (and thus also associated with a particular integrated circuit) can be read to obtain data such as a set of operating parameters for the device, e.g., a set of voltage and frequency points for corresponding temperature levels. In turn at bock 340 this information can be used to control one or more operating parameters of the device. For example, a power controller or another control logic may, based on measured temperature information from the device (or an environment in which the device is located), select an appropriate voltage and frequency and cause the device to operate at this operating point. Understand while shown at this high level in the embodiment of FIG. 3, many variations and alternatives are possible.

Figure 4:
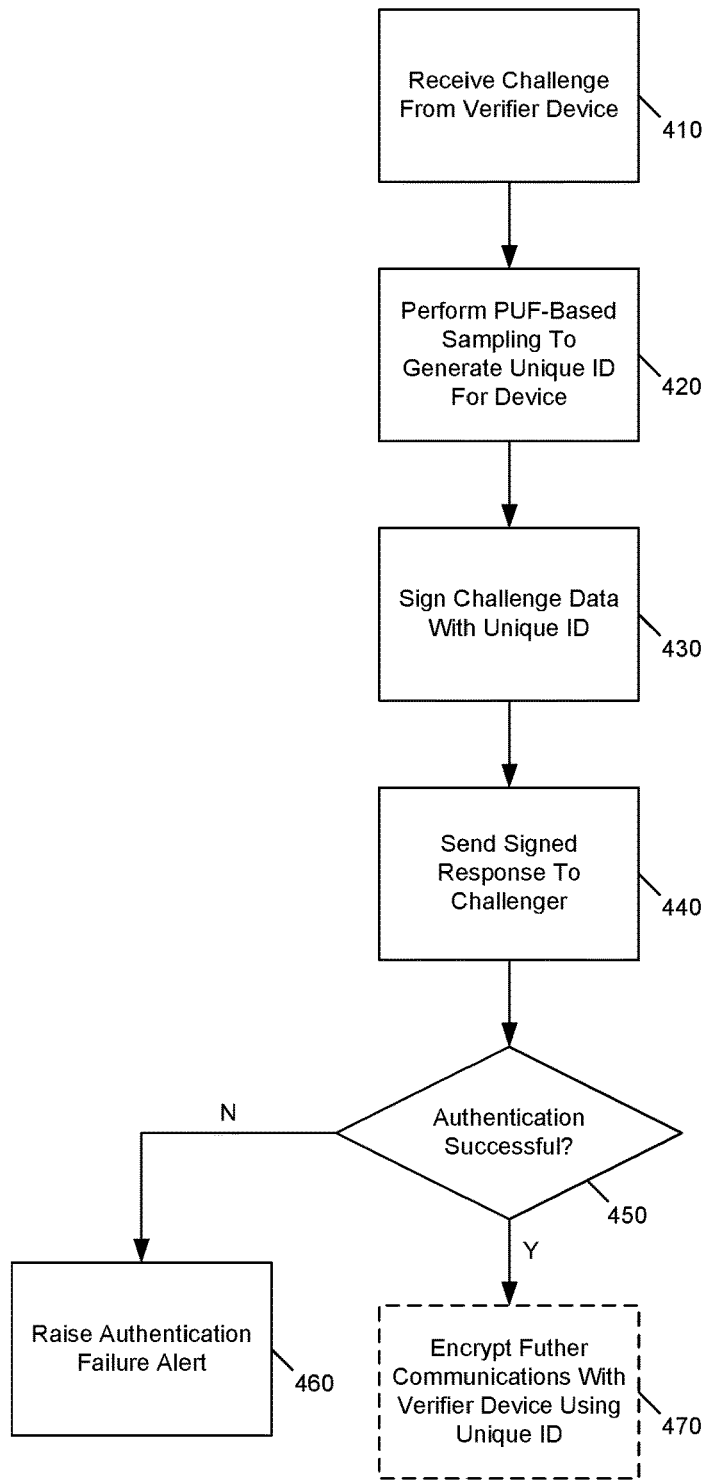
FIG. 4 is a flow diagram of a method in accordance with a still further embodiment of the present invention.

Referring now to FIG. 4, shown is a flow diagram of a method in accordance with a still further embodiment of the present invention. Method 400 shown in FIG. 4 is a method for using PUF circuitry as described herein to generate a unique identifier (such as a private key) to be used for secure communications. Method 400 may be performed by hardware circuitry, software, firmware, and/or combinations thereof. More specifically as shown in FIG. 4, method 400 begins by receiving a challenge from a verifier device (block 410). Understand that this verifier device may be a particular device for performing security operations such as authentications. In other cases, the verifier device may simply be another computing device to which the device is coupled. For example, in the context of an integrated circuit that is a sensor or other small minimally complex device such as an IoT edge device, the verifier device may be a communication partner, such as a zone controller or other intermediary device that is coupled within an IoT network between a given integrated circuit (or set of integrated circuits such as different sensors) and a master controller, such as a main processor of an IoT system, a server or so forth. In any event, this challenge may be according to a given challenge-response protocol for which the device is configured.

Next control passes to block 420, where a PUF-based sampling may be performed to generate a unique identifier for the device. In an embodiment, operations as described above with regard to FIG. 1 may be performed to generate a unique identifier for the device. Still with reference to FIG. 4, at block 430 challenge data is signed with this unique identifier. For example, the challenge data may be a nonce or other random value provided in the initial challenge request received from the verifier device. In embodiments, this signing may be performed by cryptographic circuitry of the device and can take the form of encryption of all or portion of a response to be communicated using the unique identifier as a private key.

Still with reference to FIG. 4, control next passes to block 440 where this signed response is sent to the challenger. Next it is determined whether the authentication is successful (diamond 450). For example, the verifier device may determine successful authentication where it is able to decrypt the signed communication and recover the original message (e.g., the original nonce). If is it determined that authentication is not successful, control passes to block 460 where an authentication failure alert may be raised. For example, the verifier device may communicate such alert to an administrator or another remote location.

Otherwise if authentication is successful as determined at diamond 450, interaction between the device and the verifier device may proceed. For example, in the context of an IoT sensor device, sensor information may be sent in the form of different messages to the verifier device. Still with reference to FIG. 4, in certain implementations, these further communications also may be encrypted (as shown in optional block 470). For example, using the same unique identifier each of these messages can be encrypted or otherwise signed to provide a measure of security in communication between these devices. Understand while shown at this high level in the embodiment of FIG. 4, many variations and alternatives are possible.

Figure 5:
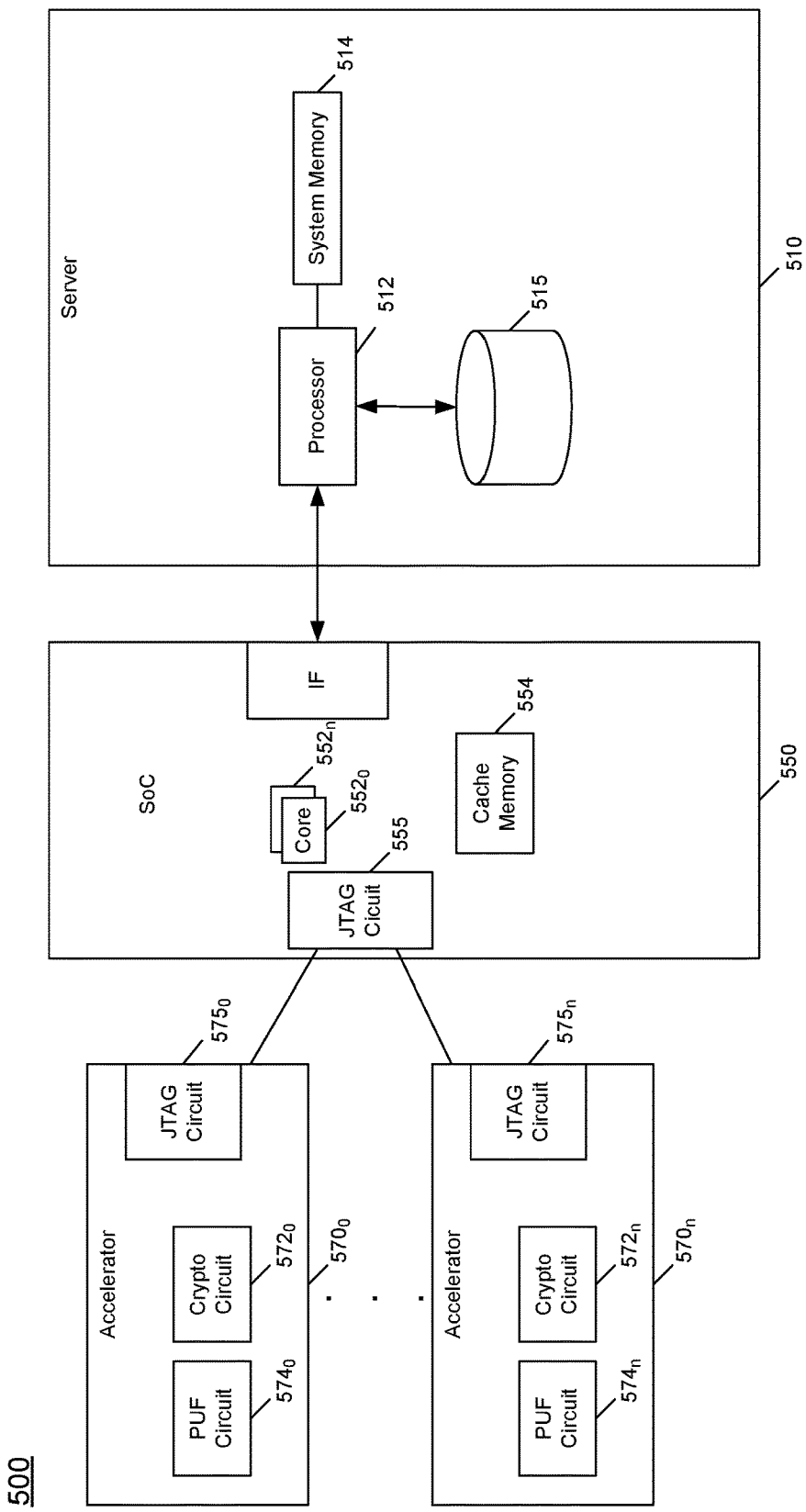
FIG. 5 is a block diagram of a system in accordance with an embodiment of the present invention.

Referring now to FIG. 5, shown is a block diagram of a system in accordance with an embodiment of the present invention. More specifically, computing system 500 illustrates an environment in which PUF circuitry as described herein can be implemented. In the particular example shown in FIG. 5, system 500 is a portion of a datacenter or other cloud-based facility that includes a representative server 510 and additional components that couple to this server. Understand that while the delineation of what constitutes server 510 is shown for example purposes in FIG. 5, a given server (which may be a rack-mounted blade server) may include additional components including the specific components shown in FIG. 5.

More specifically as illustrated, system 500 further includes a system on chip (SoC) 550. In various embodiments, SoC 550 may be an integrated circuit that acts as a controller to provide an interface and control mechanism for a plurality of accelerators $570_0$-$570_n$ coupled to it. In the particular embodiment shown in FIG. 5, accelerators 570 (generically) may be provided as dedicated accelerator circuits for performing cryptographic operations. As such, each accelerator 570 includes a fixed function accelerator circuit 572, such as for compression or encryption acceleration. In addition, each accelerator 570 further includes PUF circuitry 574 such as described herein. This is the case, as these accelerators 570 may be implemented with relatively minimal amount of compute and other circuitry and thus the expense and complexity of providing fuse-based or other non-volatile storage for storage of identification and other such information is avoided.

As further illustrated in FIG. 5, accelerators 570 may couple to SoC 550 by way of corresponding JTAG circuits within each device. Specifically as shown, accelerators 570 include JTAG circuits 575 that act to perform various diagnostic, debug and other test operations. In addition, JTAG circuit 575 may further operate as an interface to receive and communicate results of PUF-based sampling as described herein.

To this end, SoC 550 further includes a corresponding JTAG circuit 555. As further illustrated, SoC 550 is a multi-core SoC including cores $552_0$-$552_n$. In different embodiments, cores 552 may be homogeneous or heterogeneous cores and may take the form of in-order or out-of-order cores, and may be complex instruction set computing (CISC) cores, reduced instruction set computing (RISC) cores, and/or combinations of a variety of different types of microarchitectures. As further illustrated, SoC 550 also includes a cache memory 554. In embodiments described herein, cache memory 554, which may be a shared cache memory, may be used as a temporary buffer to store sample information received from PUF circuits 574 of accelerators 570.

As further illustrated, server 510 is shown at a relatively high level to include a processor 512, which may be coupled to a system memory 514, which in an embodiment may be implemented as a dynamic random access memory (DRAM). Processor 512 also couples to a mass storage 515.

In different embodiments, mass storage 515 may be implemented as hard drive, flash memory, solid state disk, among many other possible options.

In embodiments described herein, server 510 may generate workloads to be allocated to accelerators 570. For example, in the illustrated embodiment various cryptographic operations to be performed by server 510 may be offloaded to accelerators 570. As such, these cryptographic workloads can be provided to SoC 550 that in turn schedules the workloads for execution on given ones of accelerators 570.

To enable improved performance at reduced power consumption levels, SoC 550 may further control operating parameters of accelerators 570 based at least in part on environmental conditions, including a current temperature of the environment. As such, SoC 550 may be configured to access a database of parameter information as described herein, which may be stored on the SoC itself, on a disk, or in the server and transmitted to the SoC, to obtain appropriate operating parameters for given accelerators 570. Without a prior association of unique identifiers for these fuseless accelerators, a PUF-based sampling process may be dynamically performed to ascertain a unique identifier for a given accelerator, which then can be used to access the database having the characterization information to determine appropriate operating parameters, including voltage and frequency. Understand that in some cases SoC 550 may, for a given reset cycle of a particular accelerator, determine its unique identifier using the PUF-based sampling described herein and then store that association so that it need not re-determine the identifier during operation such as when temperature changes over time. In fact, in some cases the accelerator may perform the PUF sampling just once when a platform is booted the first time and then the resulting filtered PUF value is stored for the life of the platform. The platform would only have to repeat the PUF sampling if/when new accelerator ASICs are installed. Understand while shown at this high level in the embodiment of FIG. 5, many variations and alternatives are possible.

Figure 6:
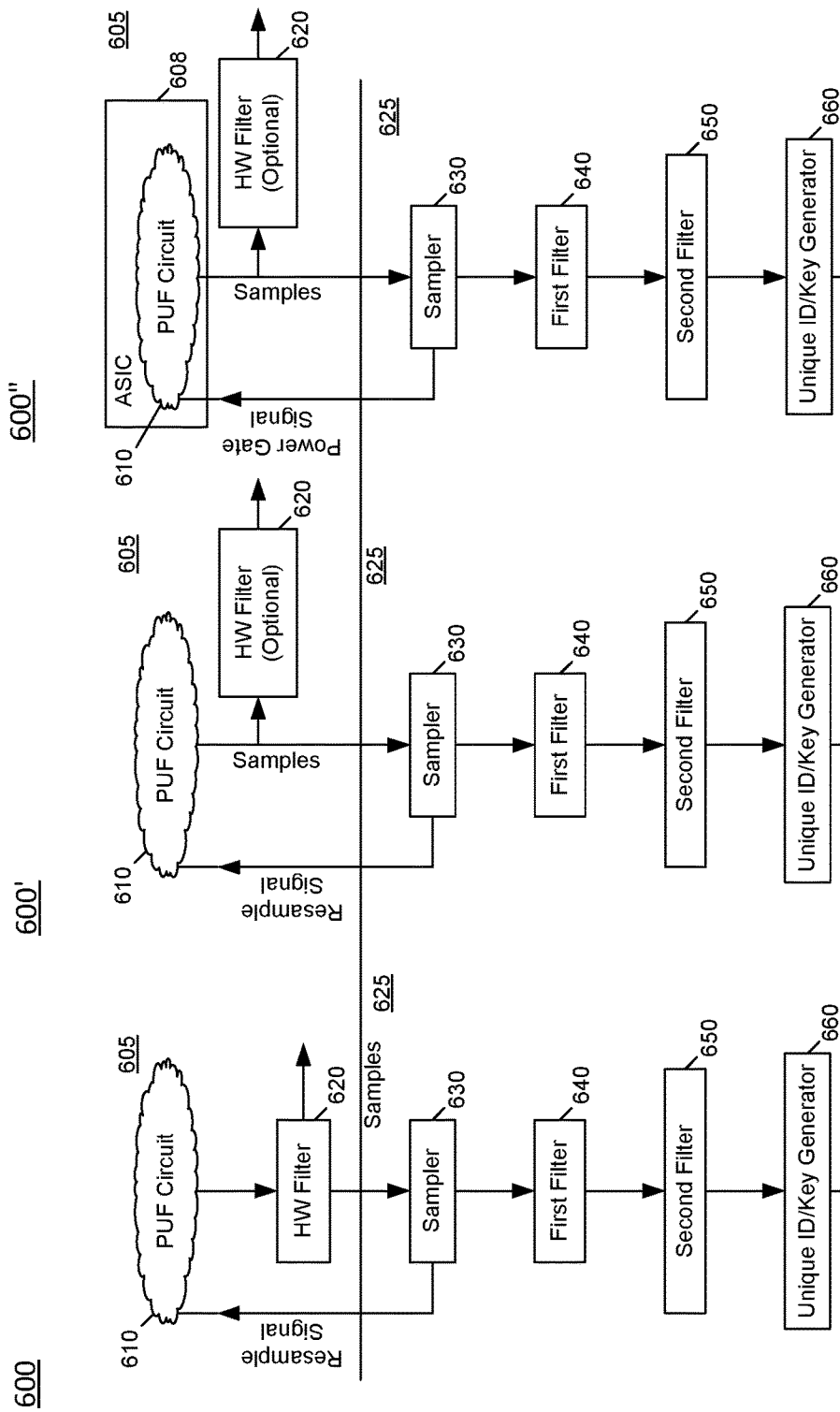
FIGS. 6A-6C are block diagrams of three variants of a hardware/software architecture solution space in accordance with an embodiment.

Referring now to FIGS. 6A-6C, shown are block diagrams of three variants of a hybrid hardware/software architecture solution space in accordance with an embodiment. In FIG. 6A, a hybrid hardware/software architecture 600 (with a fuseless device) may operate to perform initial, limited filtering in hardware. In an example, hardware may do some level of TMV and bit masking in order to provide a random number of other circuits in hardware. Software may then collect additional samples and perform more filtering to derive an ID for other uses. More specifically, software uses a much larger number of samples to produce a unique ID without inclusion of non-volatile storage. A resample flow provides a means for software to collect additional samples from the source of manufacturing variability. As illustrated in FIG. 6A, a first hybrid architecture 600 includes a hardware environment 605 and a software environment 625. In hardware environment 605, which may be implemented within a single integrated circuit or a collection of integrated circuits of a given computing system, a PUF circuit 610 is provided. Understand that PUF circuit 610 may take various forms in different embodiments. In any case, PUF circuit 610 provides a source of entropy, e.g., by way of manufacturing variability. Responsive to a resample signal received from software environment 625, PUF circuit 610 outputs PUF samples to a hardware filter 620 which may perform a first line hardware filtering function. Note that in addition to providing filtered samples to software environment 625, the filtered PUF samples also may be provided to another user of the source of entropy, such as other hardware circuits. For example a circuit responsible for updating firmware can use the unique ID to derive an ephemeral key that is shared with a management agent and used to encrypt the firmware. This could allow firmware updates to happen in a secure manner, where software running on the device could not tamper with the update.

Still with reference to FIG. 6A, software environment 625 may perform various sampling and filtering operations. Specifically as shown, the incoming PUF samples are provided to a sampler 630. In some cases, sampler 630 may buffer incoming samples and programmatically communicate resample signals to PUF circuit 610 until a threshold number of PUF samples are present. At this point, the PUF samples may be provided to a first filter 640. In various embodiments, first filter 640 may perform dark bit masking or another filter technique to identify bits within the PUF samples that have an insufficient amount of stability. These bits may be masked from further use.

After this dark bit masking or other filter function, the resulting filtered samples are provided to a second filter 650 which, in an embodiment, may perform temporal majority voting to establish a given value for each bit of the PUF samples. This resulting value per bit is provided to a generator 660, which may thus form a given unique ID and/or key. For example, the generator may cause particular bits of the resulting PUF sample (e.g., N bits) to correspond to selected bits within an M-bit unique ID/key (e.g., M less than N bits). At this point, a valid unique ID/key is present and may be used for desired operations. Understand while shown at this high level in the embodiment of FIG. 6A, many variations and alternatives are possible.

In FIG. 6B, a hybrid hardware/software architecture 600' (with fuseless, simplified circuits) may operate with software that has direct access to the raw entropy source. This architecture may be used to collect many samples, apply filtering techniques, and produce a unique ID. Hardware based filtering may optionally still be used to produce a unique ID for other uses. As illustrated in FIG. 6B, a simplified hardware environment 605 is provided, in that hardware filter 620 is an optional item, and unfiltered PUF samples output by PUF circuit 610 are directly provided to software environment 625.

In FIG. 6C, a hybrid hardware/software architecture 600'' (application specific implemented circuit (ASIC) with power gate) is shown. In this architecture, where an ASIC is to implement a unique ID, circuits can be added to the platform or ASIC to enable power gating of the source of entropy. Software can then sample the circuits without the need to power down the entire ASIC as other parts of the ASIC can continue to operate. In FIG. 6C, note that PUF circuit 610 is implemented within an ASIC 608. Instead of, software environment 625 provides a power gate signal to PUF circuit 610 to cause this circuit to be power gated when it is not needed during operation, to reduce power consumption. The main concept between FIGS. 6B and 6C is that embodiments can provision a way to quickly resample the PUF circuits. In FIG. 6B there is a resample signal that causes the circuits to generate a new sample. In FIG. 6C ASIC 608 contains power gates to physically power cycle the PUF circuits and generate a new sample. The difference is some circuits may require a power down and some may not, or in some implementations either a resample signal or a power gate may be a better implementation choice. For example, if entropy is coming from a cache instead of an inverter-based PUF circuit, the cache may be power cycled to obtain a new sample.

In some embodiments, another source of manufacturing variability may be implemented by way of a dead bit mask for a cache or other memory. In an embodiment a mask of working vs. non-working (dead) bits (or lines) may be derived from a cache. As another example, in-die variation (IDV) data can be gathered at a given temperature and voltage (such as voltage, frequency, and power data per core) and used as a source of entropy based on manufacturing variability.

A still further example of a source of variability, IDV information can be obtained from a plurality of small circuits or so-called fublets that are scattered throughout a chip. Each fublet may contain an inverter ring that generates a clock pattern, which is then fed into a sampler that counts the pulses. The count will vary based on manufacturing variation, temperature, and voltage. At a given temperature and voltage (or by applying an appropriate scaling factor), the IDV values may be used to uniquely identify a given device.

Although the scope of the present invention is not limited in this regard, embodiments are applicable to a wide variety of silicon-based devices such as secure IoT devices, such as hardware security modules, secure radio frequency identification (RFID) chips, or any chip that can respond to private key-based challenge-response requests.

By providing a hybrid hardware/software-based approach, a number of advantages can be realized. For example, included hardware circuits can be extremely simple, leading to lower cost, faster time to market, and no need for non-volatile storage, such as fuse hardware. Software can use a large number of samples to filter the circuit output. Software can be tuned and updated over time as circumstances change or algorithms are improved. Software can be modified to use other sources of manufacturing variability to derive a ID, such as dead bits in a cache or IDV.

Thus embodiments may be used to provide a unique ID capability without a manufacture-provided identifier present in non-volatile or fuse storage. Such embodiments may be used in devices for function-specific workloads like compression, cryptography, and machine learning, and edge devices such as sensors to enable greater security for communications and identity.

Figure 7:
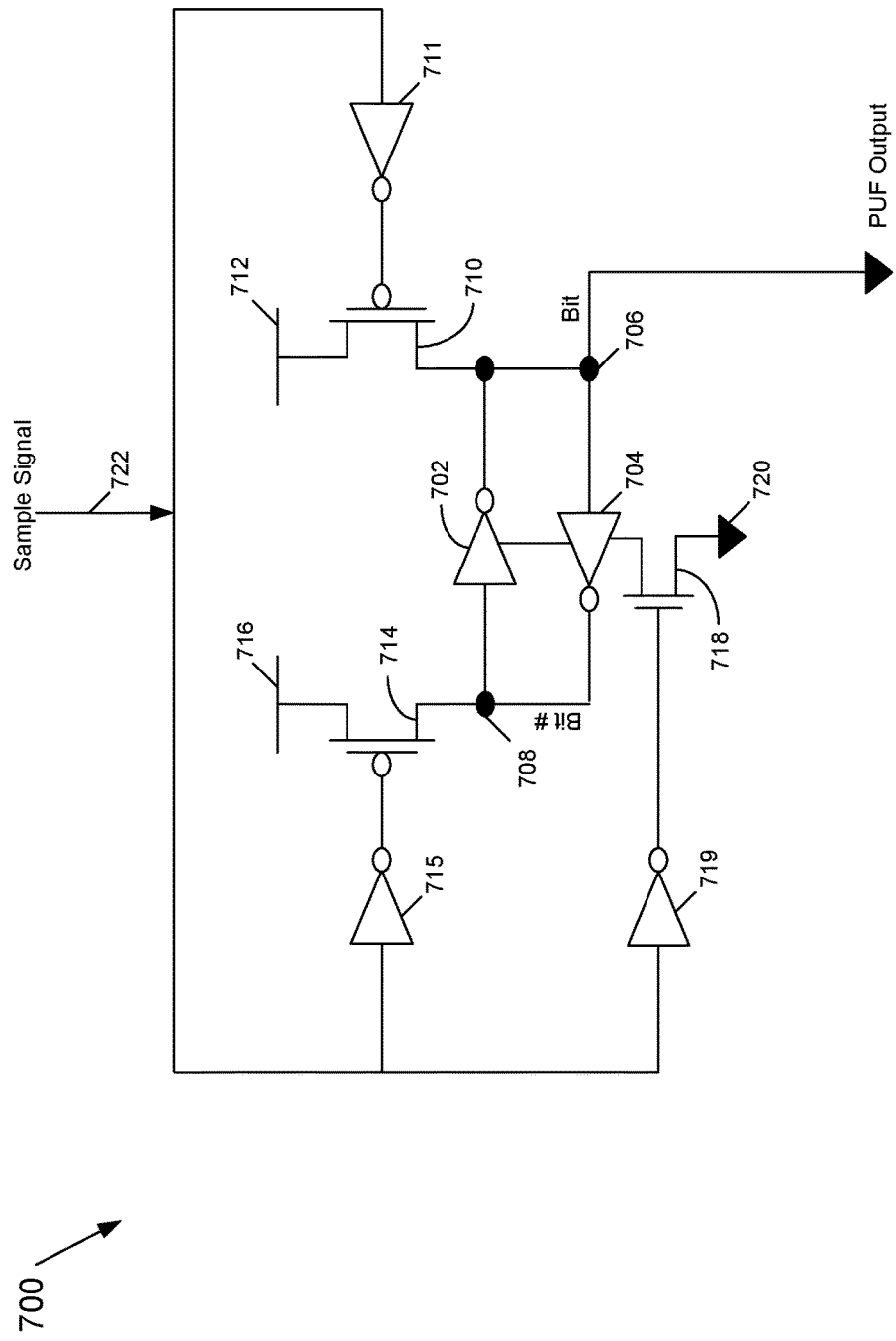
FIG. 7 is a schematic diagram of a PUF cell in accordance with an embodiment of the present invention.

FIG. 7 is a schematic diagram of a PUF cell 700 in accordance with an embodiment of the present invention. As seen, PUF cell 700 may include inverter 702 and inverter 704 that are cross-coupled with one another between a bit node 706 and a bit bar (bit#) node 708. For example, an input terminal of inverter 702 may be coupled with the bit bar node 708, and an output terminal of inverter 702 may be coupled with the bit node 706. An input terminal of inverter 704 may be coupled with the bit node 706, and an output terminal of inverter 704 may be coupled with the bit bar node 708.

In various embodiments, the PUF cell 700 may further include a pre-charge transistor 710 coupled with and between bit node 706 and a power supply terminal 712, and a pre-charge transistor 714 coupled with and between bit bar node 708 and a power supply terminal 716. Power supply terminals 712 and 716 may receive a supply voltage. For example, in some embodiments power supply terminals 712 and 716 may be coupled to one another to receive the same supply voltage.

In various embodiments, PUF cell 700 may further include a footer transistor 718 coupled with inverter 702 and inverter 704. Footer transistor 718 may be coupled between inverters 702 and 704 and ground terminal 720. Footer transistor 718 may be coupled with a transistor in cross-coupled inverters 702 and 704. For example, in some embodiments, the source terminal of footer transistor 718 may be coupled with the drain terminal of the NMOS transistor in the inverter 702 and with the drain terminal of a transistor in inverter 704. Understand that in some embodiments, PUF cell 700 may further include one or more capacitors (not shown) to reduce high frequency noise on bit node 706 and/or bit bar node 708.

In various embodiments, PUF cell 700 may receive a sample signal, e.g., from a software environment as described herein, at a clock terminal 722. The clock signal may be passed to the gate terminals of pre-charge transistors 710 and 714 via respective clock paths (e.g., via inverters 711 and 715, respectively). In some embodiments, the clock signal may be passed to pre-charge transistors 710 and 714 via respective inverters 711 and 715. Additionally, footer transistor 718 may receive the clock signal (e.g., via an inverter 719).

In various embodiments, during a first portion of a bit generation process, the clock signal may go to a first value (e.g., logic one in PUF cell 700 as shown) to turn on pre-charge transistors 710 and 714 and turn off footer transistor 718. Accordingly, bit node 706 and bit bar node 708 may both be charged to a logic one. During a second portion of the bit generation process, the clock signal may go to a second value (e.g., logic 700 in PUF cell 700 as shown) to turn off pre-charge transistors 710 and 714 and turn on footer transistor 718. During the second portion of the bit generation process, inverters 702 and 704 may contend with one another, thereby causing either bit node 706 or bit bar node 708 to go to a logic zero while the other node remains at logic one. The value of bit node 706 after the second portion of the bit generation process corresponds to the value of the output bit generated by the bit generation process. As described herein, this output bit may be provided to a software environment for storage in, e.g., a buffer, until a sufficient sample size is present to perform the filtering techniques described herein.

Figure 8:
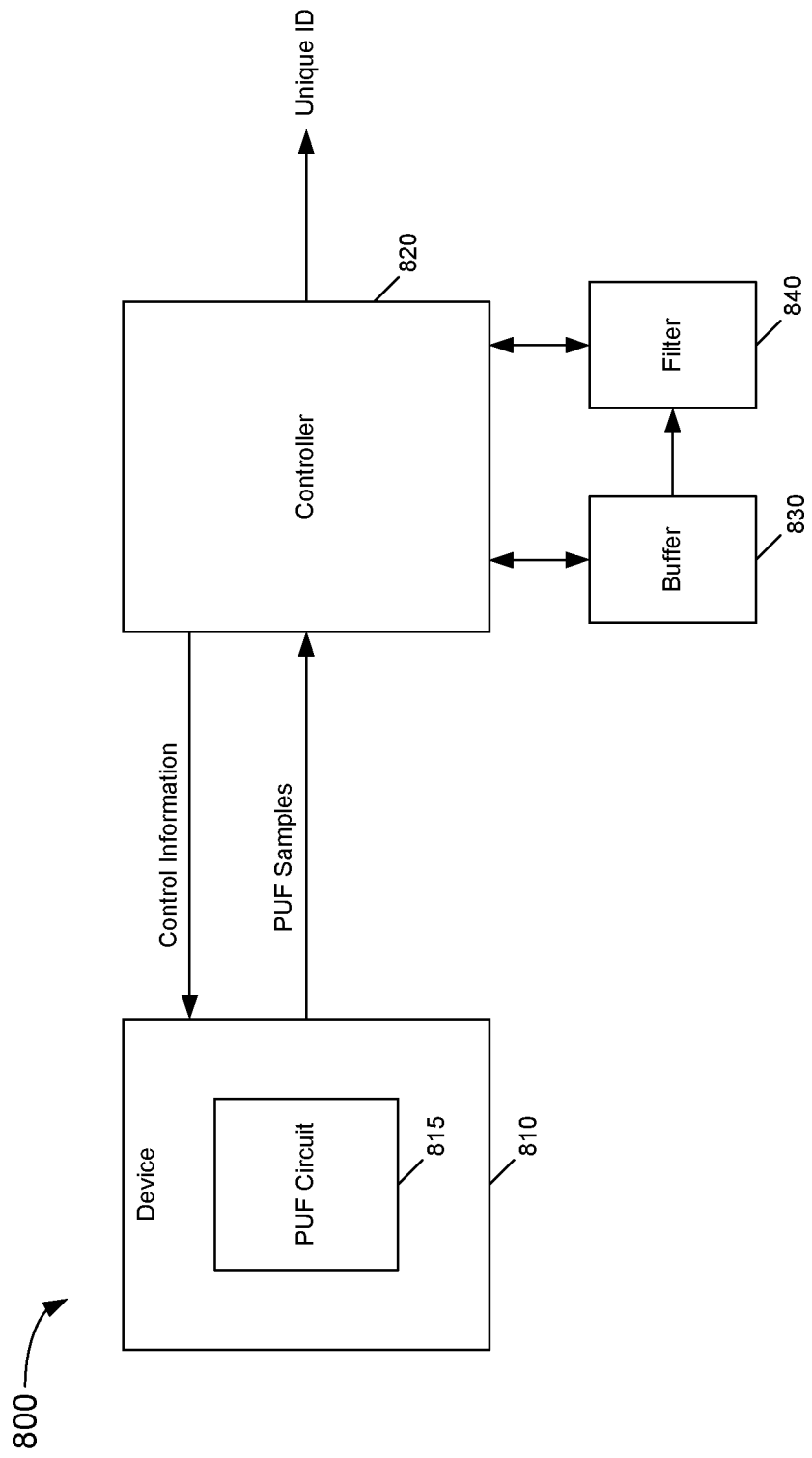
FIG. 8 is a block diagram of an apparatus in accordance with an embodiment of the present invention.

Referring now to FIG. 8, shown is a block diagram of an apparatus in accordance with an embodiment of the present invention. As illustrated in FIG. 8, an apparatus 800 includes a variety of components. In some cases, apparatus 800 may take the form of an SoC or other single die integrated circuit. In other cases, apparatus 800 may be all or part of a computing system including multiple such integrated circuits. Furthermore, while particular components are illustrated for ease of discussion in FIG. 8, understand that in other embodiments, the functionality of several of the components may be incorporated into a single integrated circuit or other component.

With reference to FIG. 8, apparatus 800 includes a device 810. Assume for purposes of discussion that device 810 is a given integrated circuit such as a relatively small minimally complex IoT device. Device 810 may take different forms, such as a sensor device, accelerator device or so forth. And as described herein, device 810 may be a fuseless integrated circuit such that it does not have the capability to maintain non-volatile storage of a unique identifier. However, device 810 includes a PUF circuit 815 as described herein.

As further seen in FIG. 8, device 810 is coupled to a controller 820. In different embodiments, controller 820 may be a microcontroller, a separate SoC, processor or other control circuit. As to operation described herein, controller 820 may communicate control information to device 810 to cause PUF circuit 815 to generate a plurality of PUF samples, which in turn may be stored within a buffer 830. In different implementations, buffer 830 may take the form of a memory device such as a DRAM, SRAM or so forth. When a desired number of PUF samples have been received and stored, they may be provided to a filter 840, which may perform various filtering techniques as described herein. In some embodiments, filter 840 may be a standalone hardware filter. In other cases, filter 840 may be implemented in software, e.g., executed within controller 820. In any case, the result of filtering performed by filter 840 is processed by controller 820 to result in a unique identifier to be associated with device 810. This unique identifier may be provided to a given consumer, such as an entity that is to use this identifier, e.g., to access database information regarding device 810, or a verifier device to perform a challenge-response protocol with device 810, based at least in part on this unique identifier. Understand while shown at this high level in the embodiment of FIG. 8, many variations and alternatives are possible.

FIG. 9A is a block diagram illustrating both an exemplary in-order pipeline and an exemplary register renaming, out-of-order issue/execution pipeline to be included in a processor according to embodiments of the present invention. FIG. 9B is a block diagram illustrating both an exemplary embodiment of an in-order architecture core and an exemplary register renaming, out-of-order issue/execution architecture core to be included in a processor according to embodiments of the present invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) unit(s) 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector register unit, a write mask register unit, and a scalar register unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. Instruction cache unit 934 and data cache unit 974 may together be considered to be a distributed L1 cache. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 may be coupled to one or more other levels of cache and eventually to a main memory.

By way of example, the exemplary register renaming, out-of-order issue/execution core architecture may implement the pipeline 900 as follows: 1) the instruction fetch unit 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set developed by MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2, and/or some form of the generic vector friendly instruction format (U=0 and/or U=1)), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a L1 internal cache, or multiple levels of internal cache. In some embodiments, the system may include a combination of an internal cache and an external cache that is external to the core and/or the processor. Alternatively, all of the caches may be external to the core and/or the processor.

Figure 10:
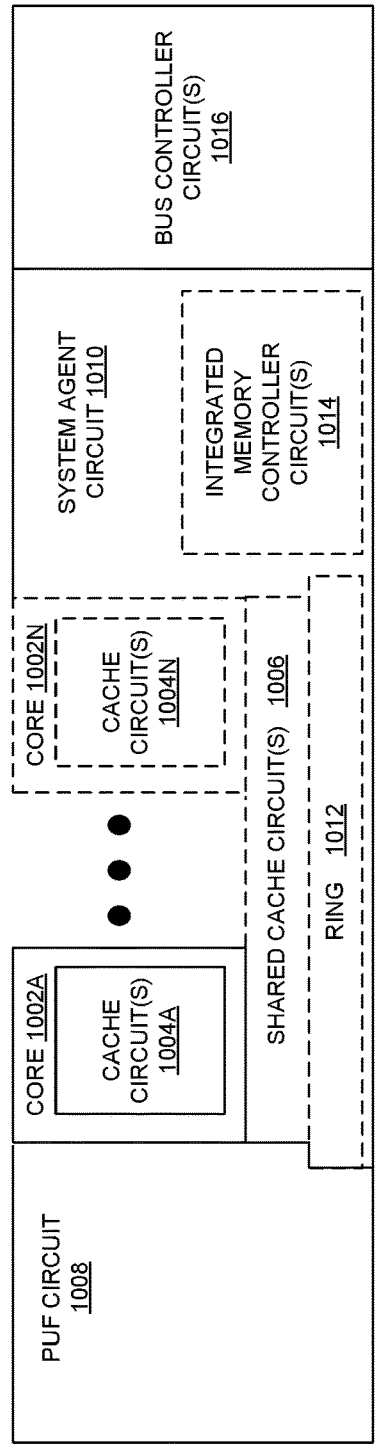
FIG. 10 is a block diagram of a single core processor and a multicore processor with integrated memory controller and graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent circuit 1010, a set of one or more bus controller circuits 1016, while the optional addition of the dashed lined boxes illustrates an alternative processor 1000 with multiple cores 1002A-N, and a set of one or more integrated memory controller circuit(s) 1014 in the system agent circuit 1010. As further illustrated in FIG. 10, processor 1000 also includes a PUF circuit 1008 as described herein, which may be leveraged by one or more of cores 1002A-1002N. In some cases, PUF circuit 1008 may be controlled to provide a large number of PUF samples to enable a hybrid hardware-software technique to generate a unique identifier as described herein.

Processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, accelerator device, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache circuits 1004A-N (including L1 cache) within the cores 1002A-N, a set of one or more shared cache circuits 1006, and external memory (not shown) coupled to the set of integrated memory controller circuits 1014. The set of shared cache circuits 1006 may include one or more mid-level caches, such as level 2 (L2), level 3 (L3), level 4 (L4), or other levels of cache, a last level cache (LLC), and/or combinations thereof. While in one embodiment a ring-based interconnect circuit 1012 interconnects special PUF circuit 1008, the set of shared cache units 1006, and the system agent circuit 1010/integrated memory controller circuit(s) 1014, alternative embodiments may use any number of well-known techniques for interconnecting such circuits. In one embodiment, coherency is maintained between one or more cache circuit 1006 and cores 1002A-N.

In some embodiments, one or more of the cores 1002A-N are capable of multi-threading. The system agent circuit 1010 includes those components coordinating and operating cores 1002A-N. The system agent circuit 1010 may include for example a power control unit (PCU) and a display unit. The PCU may be or include logic and components needed for regulating the power state of the cores 1002A-N and the PUF circuit 1008. The display unit may be for driving one or more externally connected displays.

The cores 1002A-N may be homogenous or heterogeneous in terms of architecture instruction set; that is, two or more of the cores 1002A-N may be capable of execution of the same instruction set, while others may be capable of executing only a subset of that instruction set or a different instruction set. In one embodiment, the cores 1002A-N are heterogeneous and include both the "small" cores and "big" cores described below.

Figure 11:
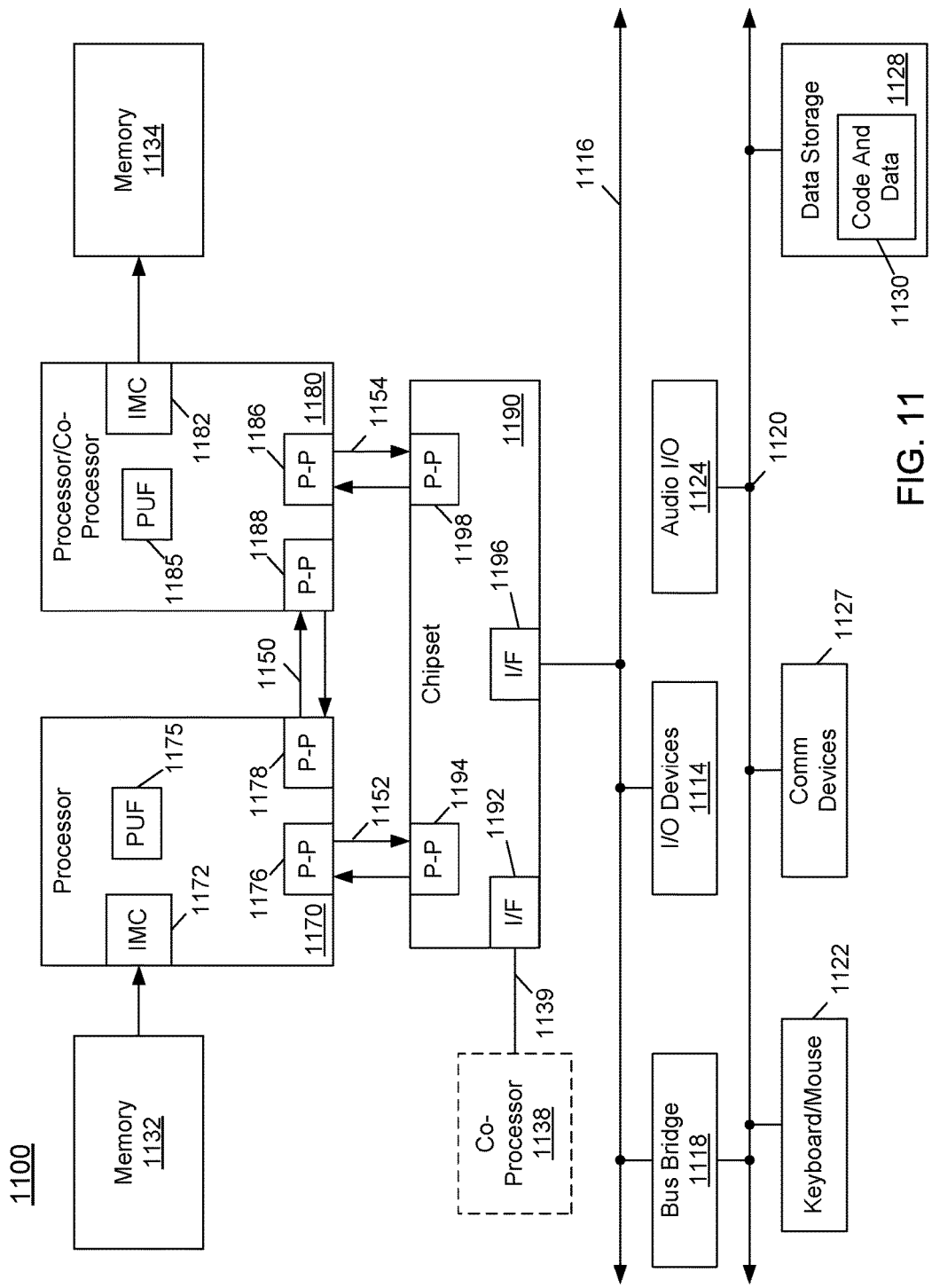
FIG. 11 illustrates a block diagram of a system in accordance with an embodiment of the present invention.

FIG. 11 is block diagram of an exemplary computer architecture. Other system designs and configurations known in the arts for laptops, desktops, tablets, handheld PCs, personal digital assistants, engineering workstations, servers, network devices, network hubs, switches, embedded processors, digital signal processors (DSPs), graphics devices, video game devices, set-top boxes, micro controllers, cell phones, smartphones, portable media players, hand held devices, and various other electronic devices, are also suitable. In general, a huge variety of systems or electronic devices capable of incorporating a processor and/or other execution logic as disclosed herein are generally suitable.

Referring now to FIG. 11, shown is a block diagram of an exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 1000 of FIG. 10.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. As seen, processors 1170, 1180 further include PUF circuits 1175, 1185 as described herein. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139 using point-to-point interface circuit 1192. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
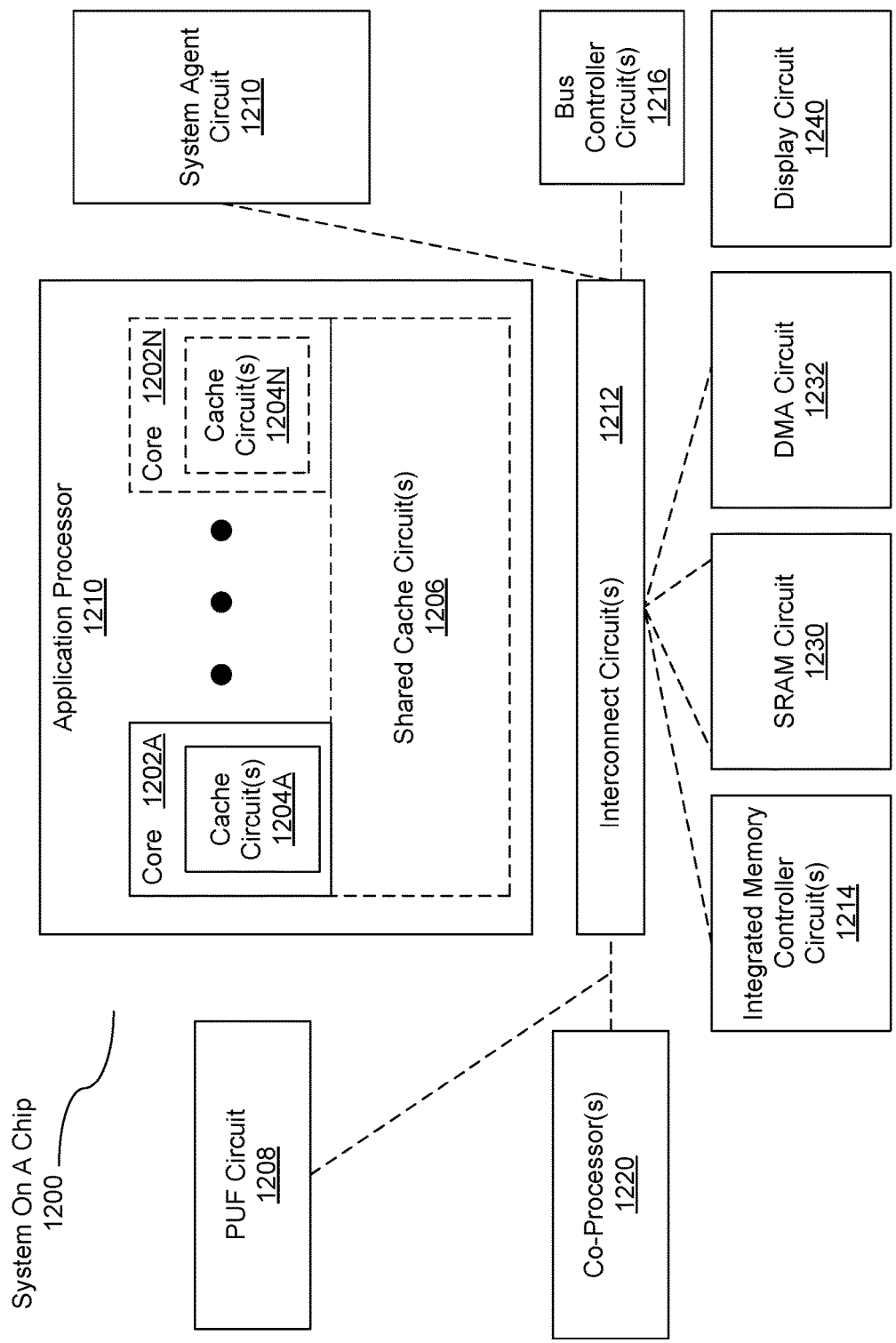
FIG. 12 illustrates a block diagram of a system on a chip (SoC) in accordance with an embodiment of the present invention.

Referring now to FIG. 12, shown is a block diagram of a SoC 1200 in accordance with an embodiment of the present invention. Also, dashed lined boxes are optional features on more advanced SoCs. In FIG. 12, an interconnect circuit(s) 1212 is coupled to: an application processor 1210 which includes a set of one or more cores 1202A-N having cache circuit(s) 1204A-1204N, and shared cache circuit(s) 1206; a PUF circuit 1208 as described herein which may be shared by multiple ones of cores 1202A-1202N; a system agent circuit 1210; a bus controller circuit(s) 1216; an integrated memory controller circuit(s) 1214; a set of one or more coprocessors 1220 which may include integrated graphics logic, an image processor, an audio processor, and a video processor; a static random access memory (SRAM) circuit 1230; a direct memory access (DMA) circuit 1232; and a display circuit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Program code, such as code 1130 illustrated in FIG. 11, may be applied to input instructions to perform the PUF functions and generate output information such as a unique identifier as described herein. Such identifier may be applied to one or more output devices to enable, e.g., access to protected content. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible non-transitory, machine readable medium and supplied to various customers or manufacturing facilities to load into the fabrication machines that actually make the logic or processor. Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel® x86 instruction set core or (2) object code versions of applications or other software targeted to run on an Intel processor with at least one x86 instruction set core, in order to achieve substantially the same result as an Intel® processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

The following examples pertain to further embodiments.

In one example, an apparatus comprises: a device having a PUF circuit including a plurality of PUF cells to generate a PUF sample responsive to at least one control signal; a controller coupled to the device, the controller to send the at least one control signal to the PUF circuit and to receive a plurality of PUF samples from the PUF circuit; a buffer having a plurality of entries each to store at least one of the plurality of PUF samples; and a filter to filter the plurality of PUF samples to output a filtered value, where the controller is to generate a unique identifier for the device based at least in part on the filtered value.

In an example, the device comprises a fuseless integrated circuit.

In an example, the fuseless integrated circuit comprises an IoT sensor device.

In an example, the controller is, in response to a determination that a number of the plurality of PUF samples meets a threshold number, to cause the plurality of PUF samples to be provided to the filter.

In an example, the filter is to determine a majority vote for each of a plurality of bits of the plurality of PUF samples, the filtered value corresponding to the majority vote for each of the plurality of bits.

In an example, the filter is to mask a first bit of the plurality of bits when a count of first values of the first bit in the plurality of PUF samples is not within a threshold range.

In an example, the controller is to dynamically adjust the threshold number.

In an example, the device is to use the unique identifier as a private key.

In an example, the device further comprises a cryptographic circuit to sign a data block with the unique identifier.

In an example, at least some of the plurality of PUF cells comprise a cross-coupled inverter circuit.

In an example, at least some of the plurality of PUF cells comprise a ring of inverters to generate a clock pattern.

In an example, the device comprises a microcontroller to use the unique identifier to perform a challenge-response protocol with a verifier.

In an example, the apparatus further comprises a power controller to: access an entry in a characterization table using the unique identifier; and control one or more operating parameters of the device based on information stored in the entry.

In another example, a method comprises: requesting a PUF circuit of a first integrated circuit to generate a PUF sample; receiving the PUF sample from the PUF circuit and storing the PUF sample in an entry of a sample storage; and responsive to determining that a number of PUF samples stored in the sample storage meets a threshold, filtering the plurality of PUF samples according to at least one filter technique to generate a unique identifier for the first integrated circuit based at least in part on the filtered plurality of PUF samples.

In an example, the method further comprises: causing the first integrated circuit to operate at an operating point; collecting metric information from the first integrated circuit during operation at the operating point; and storing at least some of the metric information in a database in association with the unique identifier.

In an example, the method further comprises: receiving, in the first integrated circuit, a challenge from a verifier device; signing a challenge response, in the first integrated circuit, with the unique identifier; and sending the signed challenge response to the verifier device.

In an example, the method further comprises: generating a message, in the first integrated circuit, the message including at least first sensor information; encrypting the message, in the first integrated circuit, using the unique identifier; and sending the encrypted message to a destination device.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises: a first integrated circuit including at least one accelerator circuit and a PUF circuit including a plurality of PUF cells to generate a PUF sample responsive to at least one control signal; and a controller coupled to the first integrated circuit to provide a workload to the first integrated circuit and to control at least one operating parameter of the first integrated circuit. In an example, the controller is to: send a plurality of sample signals to the first integrated circuit to enable receipt in the controller of a plurality of PUF samples for the first integrated circuit; buffer the plurality of PUF samples in at least one storage; filter the plurality of PUF samples according to a plurality of filter techniques to output a filtered value; and identify the first integrated circuit based at least in part on the filtered value.

In an example, the controller is to: access an entry in a characterization table using the filtered value; and control the at least one operating parameter of the first integrated circuit based on information stored in the entry.

In an example, the system comprises a server having at least one processor, a mass storage and a communication interface, the controller coupled to the at least one processor via the communication interface, and where the first integrated circuit comprises a fuseless semiconductor device and the at least one accelerator circuit comprises a cryptographic circuit.

In an example, the controller is to: determine a majority vote for each of a plurality of bits of the plurality of PUF samples, the filtered value corresponding to a majority value for each of the plurality of bits; and mask a first bit of the plurality of bits when a count of first values of the first bit in the plurality of PUF samples is not within a threshold range.

In an example, the controller is to cause the PUF circuit to be power cycled a plurality of times during operation of the first integrated circuit in response to the plurality of sample signals to enable the receipt of the plurality of PUF samples, and to thereafter cause the PUF circuit to be power gated after the first integrated circuit is identified based at least in part on the filtered value.

In a still further example, an apparatus comprises: means for generating a plurality of PUF samples; means for storing the plurality of PUF samples; and means, responsive to determining that a number of plurality of PUF samples stored in the means for storing meets a threshold, for filtering the plurality of PUF samples according to at least one filter technique to generate a unique identifier based at least in part on the filtered plurality of PUF samples.

In an example, the apparatus further comprises: means for causing the apparatus to operate at an operating point; means for collecting metric information during operation at the operating point; and means for storing at least some of the metric information in a database means in association with the unique identifier.

In an example, the apparatus further comprises: means for receiving a challenge from a verifier device; means for signing a challenge response with the unique identifier; and means for sending the signed challenge response to the verifier device.

In an example, the apparatus further comprises: means for generating a message including at least first sensor information; means for encrypting the message using the unique identifier; and means for sending the encrypted message to a destination device.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a device having a physically unclonable function (PUF) circuit including a plurality of PUF cells to generate a PUF sample responsive to at least one control signal;
a controller coupled to the device, the controller to send the at least one control signal to the PUF circuit and to receive a plurality of PUF samples from the PUF circuit;
a buffer having a plurality of entries each to store at least one of the plurality of PUF samples; and
a filter to filter the plurality of PUF samples to output a filtered value, wherein the filter is to determine a majority vote for each of a plurality of bits of the plurality of PUF samples, the filtered value corresponding to the majority vote for each of the plurality of bits and mask a first bit of the plurality of bits when a count of first values of the first bit in the plurality of PUF samples is not within a threshold range, wherein the controller is to generate a unique identifier for the device based at least in part on the filtered value, and in response to a determination that a number of the plurality of PUF samples meets a threshold number, to cause the plurality of PUF samples to be provided to the filter.

2. The apparatus of claim 1, wherein the device comprises a fuseless integrated circuit.

3. The apparatus of claim 2, wherein the fuseless integrated circuit comprises an Internet of Things (IoT) sensor device.

4. The apparatus of claim 1, wherein the controller is to dynamically adjust the threshold number.

5. The apparatus of claim 1, wherein the device is to use the unique identifier as a private key.

6. The apparatus of claim 1, wherein the device further comprises a cryptographic circuit to sign a data block with the unique identifier.

7. The apparatus of claim 1, wherein at least some of the plurality of PUF cells comprise a cross-coupled inverter circuit.

8. The apparatus of claim 1, wherein at least some of the plurality of PUF cells comprise a ring of inverters to generate a clock pattern.

9. The apparatus of claim 1, wherein the device comprises a microcontroller to use the unique identifier to perform a challenge-response protocol with a verifier.

10. The apparatus of claim 1, further comprising a power controller to:
access an entry in a characterization table using the unique identifier; and
control one or more operating parameters of the device based on information stored in the entry.

11. A non-transitory machine-readable medium having stored thereon one or more instructions, which if performed by a machine, cause the machine to perform a method comprising:
requesting a physically unclonable function (PUF) circuit of a first integrated circuit to generate a PUF sample;
receiving the PUF sample from the PUF circuit and storing the PUF sample in an entry of a sample storage; and
responsive to determining that a plurality of PUF samples stored in the sample storage meets a threshold, filtering the plurality of PUF samples according to at least one filter technique to generate a unique identifier for the first integrated circuit based at least in part on the filtered plurality of PUF samples, wherein filtering the plurality of PUF samples comprises determining a majority vote for each of a plurality of bits of the plurality of PUF samples, the filtered value corresponding to the majority vote for each of the plurality of bits and masking a first bit of the plurality of bits when a count of first values of the first bit in the plurality of PUF samples is not within a threshold range.

12. The non-transitory machine-readable medium of claim 11, wherein the method further comprises:
causing the first integrated circuit to operate at an operating point;
collecting metric information from the first integrated circuit during operation at the operating point; and
storing at least some of the metric information in a database in association with the unique identifier.

13. The non-transitory machine-readable medium of claim 11, wherein the method further comprises:
receiving, in the first integrated circuit, a challenge from a verifier device;
signing a challenge response, in the first integrated circuit, with the unique identifier; and
sending the signed challenge response to the verifier device.

14. The non-transitory machine-readable medium of claim 11, wherein the method further comprises:
generating a message, in the first integrated circuit, the message including at least first sensor information;
encrypting the message, in the first integrated circuit, using the unique identifier; and
sending the encrypted message to a destination device.

15. A system comprising:
a first integrated circuit including at least one accelerator circuit and a physically unclonable function (PUF) circuit including a plurality of PUF cells to generate a PUF sample responsive to at least one control signal; and a controller coupled to the first integrated circuit to provide a workload to the first integrated circuit and to control at least one operating parameter of the first integrated circuit, the controller to:
send a plurality of sample signals to the first integrated circuit to enable receipt in the controller of a plurality of PUF samples for the first integrated circuit;
buffer the plurality of PUF samples in at least one storage;
in response to a determination that a number of the plurality of PUF samples meets a threshold number, filter the plurality of PUF samples according to a plurality of filter techniques to output a filtered value, the plurality of filter techniques comprising to determine a majority vote for each of a plurality of bits of the plurality of PUF samples, the filtered value corresponding to the majority vote for each of the plurality of bits and to mask a first bit of the plurality of bits when a count of first values of the first bit in the plurality of PUF samples is not within a threshold range; and
identify the first integrated circuit based at least in part on the filtered value.

16. The system of claim 15, wherein the controller is to:
access an entry in a characterization table using the filtered value; and
control the at least one operating parameter of the first integrated circuit based on information stored in the entry.

17. The system of claim 15, wherein the system comprises a server having at least one processor, a mass storage and a communication interface, the controller coupled to the at least one processor via the communication interface, and wherein the first integrated circuit comprises a fuseless semiconductor device and the at least one accelerator circuit comprises a cryptographic circuit.

18. The system of claim 15, wherein the controller is to cause the PUF circuit to be power cycled a plurality of times during operation of the first integrated circuit in response to the plurality of sample signals to enable the receipt of the plurality of PUF samples, and to thereafter cause the PUF circuit to be power gated after the first integrated circuit is identified based at least in part on the filtered value.

* * * * *